(12) United States Patent
Hukill et al.

(10) Patent No.: US 6,660,427 B1
(45) Date of Patent: Dec. 9, 2003

(54) LATCH ASSEMBLY FOR PORTABLE ELECTRONIC DEVICE

(75) Inventors: Victor J. Hukill, Elgin, IL (US); David G. Teteak, Crystal Lake, IL (US)

(73) Assignee: Motorola Inc., Schaumburg, IL (US)

( * ) Notice: Subject to any disclaimer, the term of this patent is extended or adjusted under 35 U.S.C. 154(b) by 351 days.

(21) Appl. No.: 09/706,283

(22) Filed: Nov. 6, 2000

(51) Int. Cl.[7] .............................................. H01M 2/10
(52) U.S. Cl. ........................ 429/97; 455/347; 361/600; 361/814
(58) Field of Search ..................... 429/97–100; 292/17, 292/80, 175; 439/96–100; 455/347–349; 361/600, 814

(56) References Cited

U.S. PATENT DOCUMENTS

| | | | |
|---|---|---|---|
| 4,231,598 A | * 11/1980 | Natale, Jr. | ................. 292/210 |
| 4,904,549 A | * 2/1990 | Goodwin | ..................... 429/97 |
| 5,028,083 A | 7/1991 | Mischenko | |
| 5,244,755 A | * 9/1993 | Benoist et al. | ................. 429/97 |
| 5,634,675 A | * 6/1997 | Mo | .............................. 292/80 |
| 5,762,512 A | * 6/1998 | Trant | ........................... 439/347 |
| 5,851,692 A | 12/1998 | Potts | |
| 5,856,038 A | * 1/1999 | Mason | ......................... 429/97 |
| 5,869,204 A | * 2/1999 | Kottke | ........................ 429/100 |
| 5,881,823 A | * 3/1999 | Kabatnik | ..................... 173/217 |
| 5,895,729 A | * 4/1999 | Phelps, III et al. | ........... 429/97 |
| 5,935,729 A | * 8/1999 | Mareno | ....................... 429/100 |

FOREIGN PATENT DOCUMENTS

EP            1025962         * 1/2000 ............ B25F/5/02

* cited by examiner

Primary Examiner—Mark Ruthkosky
(74) Attorney, Agent, or Firm—Paul J. Bartusiak; Lawrence Chapa

(57) ABSTRACT

A latching assembly for a battery door of a portable electronic device includes a latch body that is retained on either the battery door or the housing of the device and which includes an encapsulated biasing spring and snapping catches that cannot be accessed by a user.

11 Claims, 7 Drawing Sheets

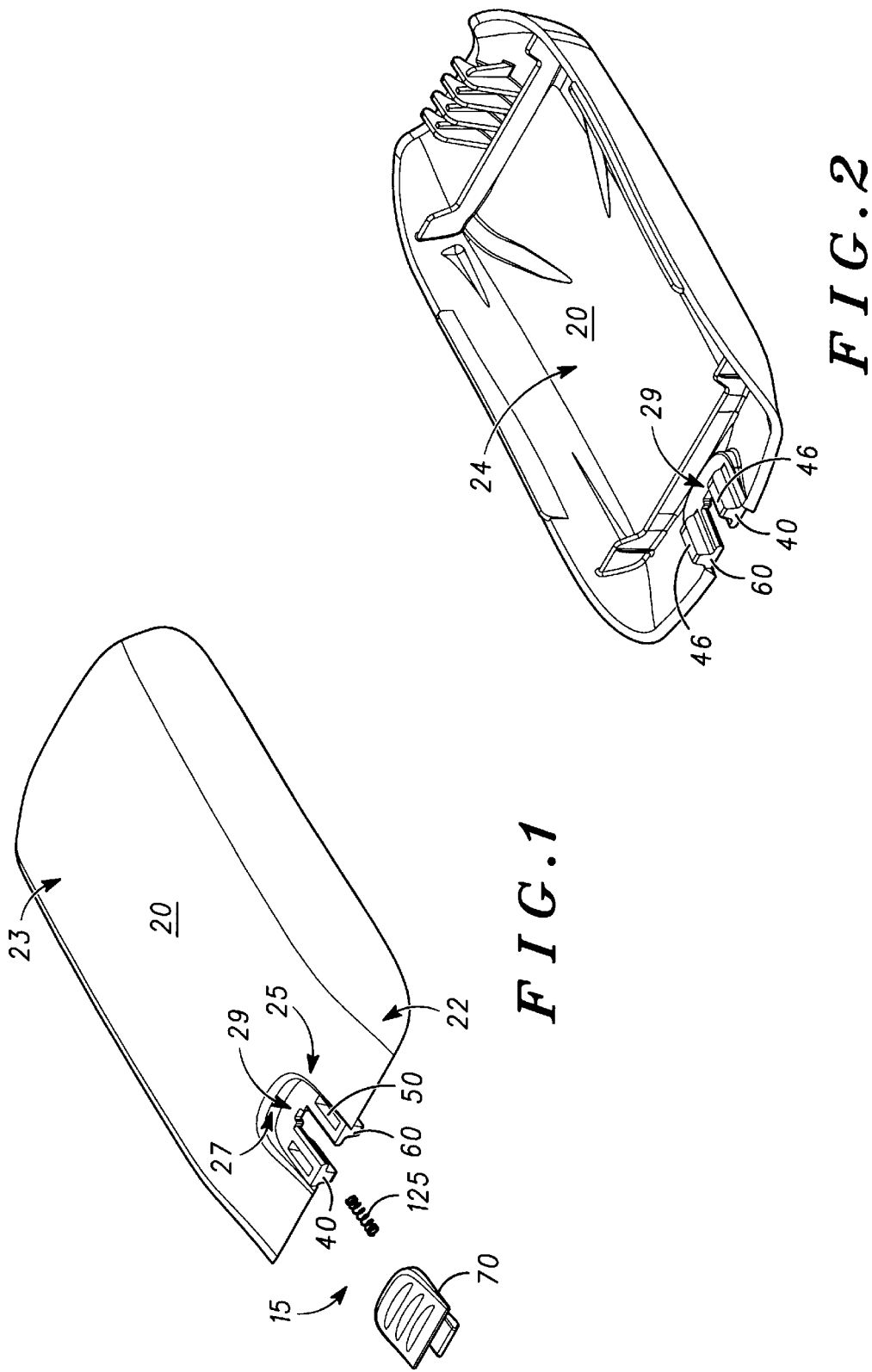

LATCH ASSEMBLY FOR PORTABLE ELECTRONIC DEVICE

FIELD OF THE INVENTION

This invention relates to battery door latches, and more specifically, to a low profile, encapsulated door latch that protects the latch assembly from tampering and from degradation from foreign material.

BACKGROUND OF THE INVENTION

Battery latches for portable electronic devices are well known in the art. However, prior art battery latches are usually beleaguered by poor mechanical reliability since the components are usually exposed, leaving the latch unprotected from damage by users of the device. Moreover, unprotected latching assemblies have an inability to withstand everyday use over the life of the battery and/or device in that the battery latches usually break during use or transport.

Many prior art latching assemblies also incorporate springs for biasing a latch mechanism into a latched or closed position. One problem with these types of preloaded latching devices is that the springs are usually exposed, leading to damage from tampering when the battery door is removed. Another problem with exposed spring type latches is that foreign matter such as dirt, sand, lint, or even food particles become entrapped within the coils of the spring, which interferes with the function of the spring, which in turn can usually hinder free movement of the latch door and even lead to degradation of the battery operation and/or performance.

Furthermore, most prior art latching devices which address the mechanical reliability problems are usually cumbersome and bulky. Therefore, they seldom find application in the down-sized, low profile electronic devices being marketed today.

Therefore, a new latching design is needed for a battery door latching assembly which protects the latches and springs in order to overcome the above-mentioned problems.

BRIEF DESCRIPTION OF THE DRAWINGS

The features and advantages of the invention will be further understood upon consideration of the following detailed description of an embodiment of the invention taken in conjunction with the drawings, in which:

FIG. 1 is an exploded perspective view of an electronic device battery door incorporating the latch assembly formed in accordance with the invention;

FIG. 2 is a bottom view of the battery door shown in FIG. 1;

DETAILED DESCRIPTION OF PREFERRED EMBODIMENTS

A latching assembly for a battery door/cover of a portable electronic device, such as a radiotelephone, includes a latch body that is retained on either the battery door or the housing of the device. The latching assembly includes an encapsulated biasing spring and snapping catches that cannot be accessed by a user. This encapsulation prevents foreign material from corrupting the latching assembly apparatus, and it prevents a user from inadvertently detaching a latch body portion from the latching assembly; this prevents the user from damaging components.

Figure 13:
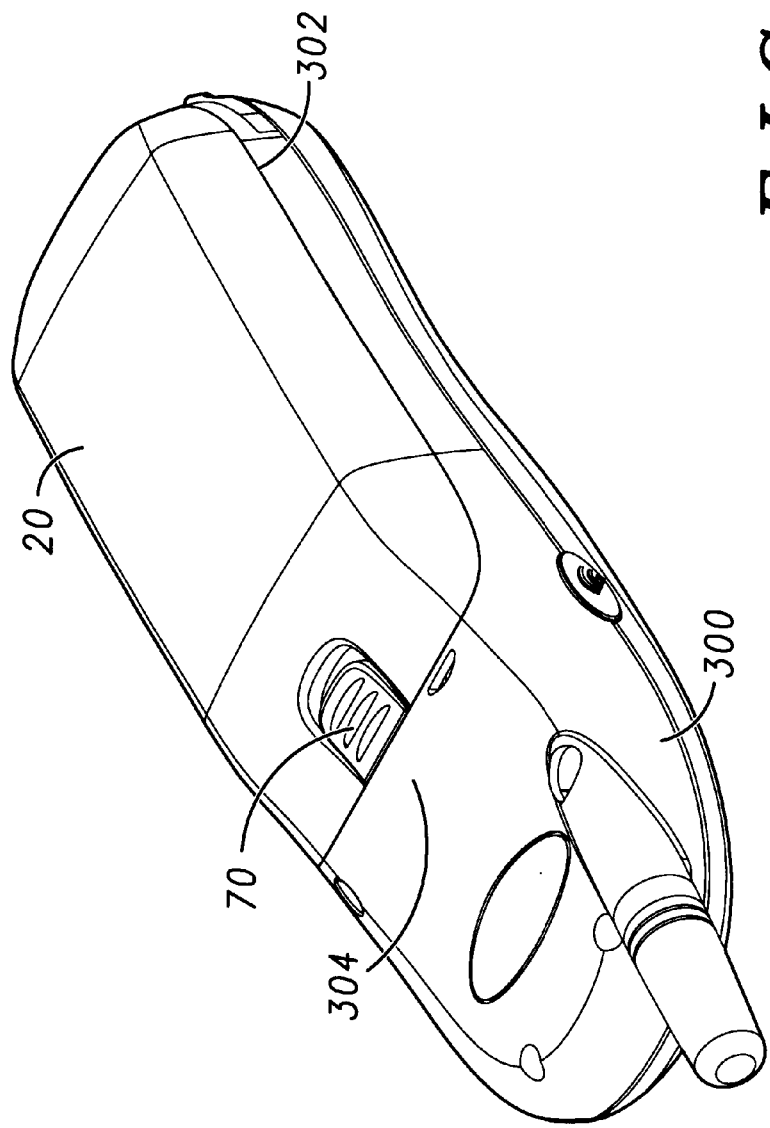
FIG. 13 is a perspective view of a cellular telephone and an associated battery incorporating the latch assembly apparatus.

FIG. 1 is a top perspective view of a door 20 (also referred to as a battery cover or battery housing portion) for an electronic device such as a cellular telephone 300 (FIG. 13). The door is combined with a battery cell (not shown), and the combination is detachably coupled to a compartment 302 of the cellular telephone 300 as shown in FIG. 13.

The door 20 (FIG. 1) incorporates a latching assembly 15, and the battery door 20 has an end 22 (FIG. 1) formed to have a latch retaining recess 25 in the top surface 23 of the door 20. The latch retaining recess 25 projects into the interior space 24 (FIG. 2) of the door 20. The latch retaining recess 25 is a portion of the latching assembly 15 and includes a base wall surface 29 with catch a pocket 50 and a wall surface 27. A latch body 70 and the latch body biasing spring 125 are also portions of the latching assembly 15.

Figure 4:
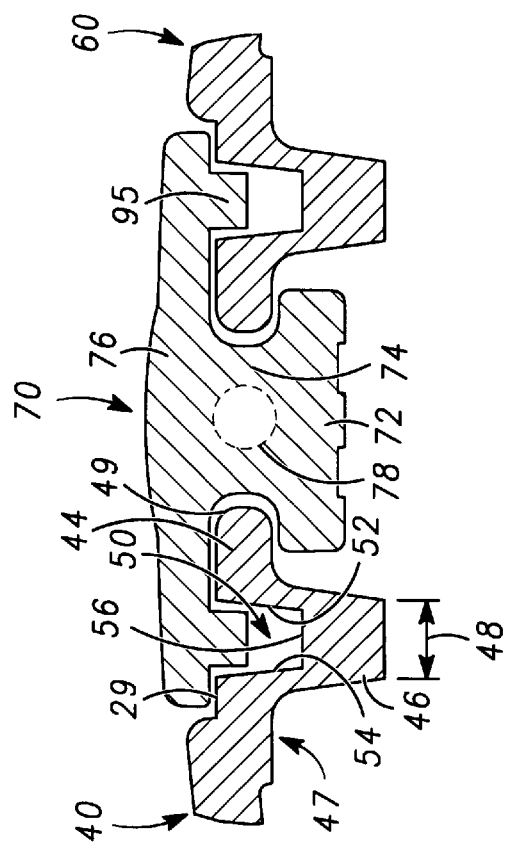
FIG. 4 is a partial cross-sectional view of the latch body retaining recess, and a latch body in accordance with the present invention.
Figure 3:
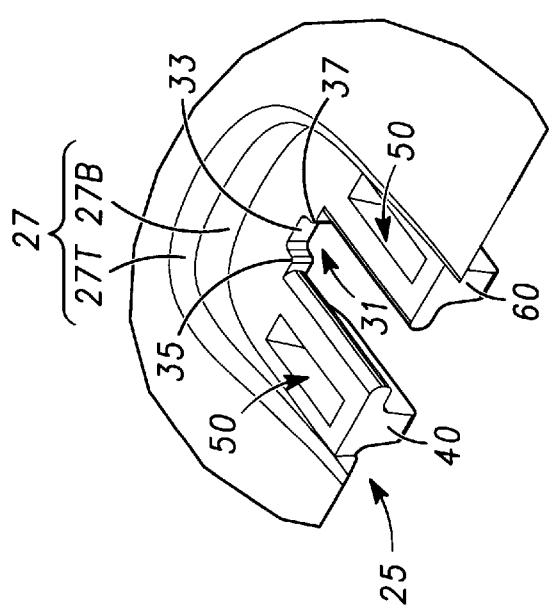
FIG. 3 is a perspective view detailing a latch body retaining recess which forms a part of the latching assembly in accordance with the invention.

FIGS. 1 and 3 shows that the latch retaining recess 25 is comprised of a sweeping wall surface 27 having a U-shaped configuration that is integrally formed with the base wall surface 29 (that also has a U-shaped configuration). The base wall surface 29 is disposed perpendicular to a first portion 27B of wall surface 27. A second portion 27T of wall surface 27 is disposed at an acute angle with respect to portion 27B, providing the perimeter edge of the latch retaining recess 25 with a chamfer that interacts with the latch body 70 to maintain a low profile configuration when the latch body 70 is attached to door 20. Under normal use a user is not able to remove the latch body 70 from the attachment portion and, therefore, the latch body 70 is considered substantially permanently attached to the attachment portion (e.g., the retaining recess 25, shown formed in the door 20). The base wall surface 29 also includes the notched cutout 31 that is defined by the base surface 33 and the side surfaces 35, 37, which are essentially in the form of rounded nubs. The notched cutout 31 is designed to retain the latch body biasing spring 125, as will be explained later herein. The base wall surface 29 is formed with the downwardly depending and laterally spaced first and second legs 40, 60 which have a cross-sectional configuration generally in the shape of a "T." As shown in FIG. 4, each leg 40, 60 is comprised of a longitudinally disposed flange 44 integrally connected to a vertical web 46. The vertical web 46 has a longitudinal extent shown at 48. As best seen in the cross-sectional view of FIG. 4, each leg 40 and 60 is identically shaped, therefore only the first or left leg 40 will be described in greater detail. The longitudinal flange 44 includes a top surface that is actually the previously identified based wall surface 29. It further includes the bottom surface identified at 47, and the rounded edge surface 49 extending between the wall surface 29 and bottom surface 47. The rounded edge surface 49 forms a rail which functions to retain and slide the latch body 70 therealong, as will become clearer later when the operation of the latching assembly is provided.

Figure 8B:
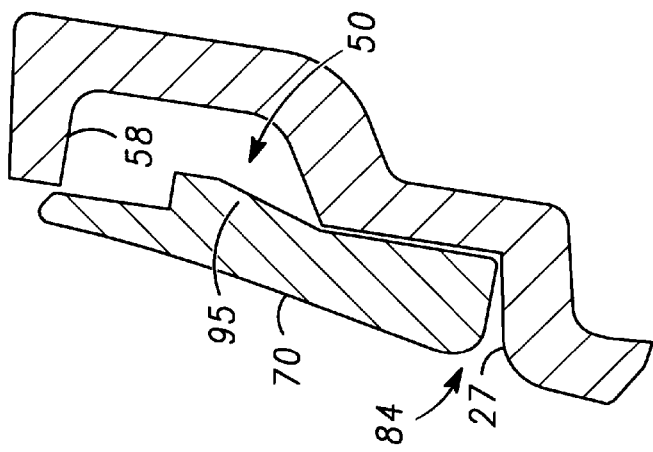
FIG. 8B is the latching assembly of FIG. 8A, shown in an unlatched position.
Figure 8A:
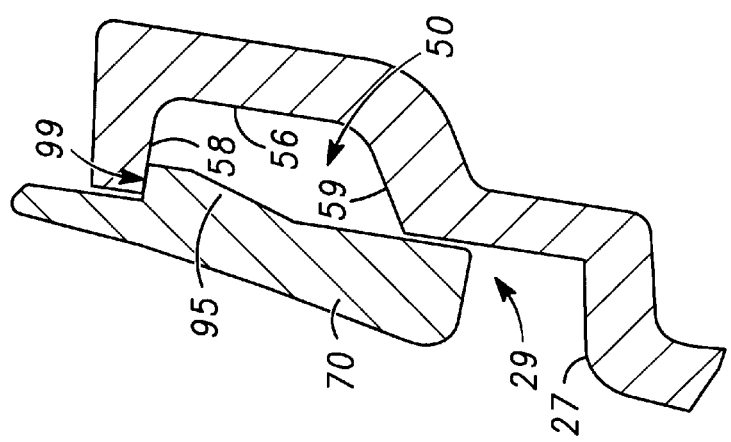
FIG. 8A is a partial cross-sectional view highlighting the snap catch and catch pocket of the latching assembly in a latched position.

A protective catch pocket 50 is formed in the leg 40, extending downwardly into an upper portion of the vertical web 46. By extending into the vertical web 46, the present latching assembly 15 uniquely saves dimensional space in the design of the battery door, thereby allowing the latching assembly made in accordance with the present invention to be incorporated into a plurality of low-profiled electronic devices. The protective catch pocket 50 is also centered within the longitudinal extent 48 of the vertical web 46 such that each sidewall 52, 54 of pocket 50 will have a uniform wall thickness. The protective catch pocket 50 has a depth corresponding to the height of the vertical sidewalls 52, 54, as defined by the distance between base wall 56 and top surface 29. As seen in FIG. 8A, a front wall 58 of the protective catch pocket 50 interacts with a snap catch 95 which will be explained later. A back wall 59 is spaced from front wall 58 by a predetermined extent that corresponds to a desired travel distance of latch body 70, which in this embodiment is about 2 mm. Referring again to FIG. 3, it is seen that in this embodiment, each protective catch pocket 50 has a rectangular shape where the sidewalls 52, 54 appear to correspond in length or extent to that of each rail 49. However, FIG. 8A shows that each protective catch pocket 50 does not extend all the way to wall 27, but rather extends to about a halfway point.

Referring to FIGS. 4–7, the latch body 70 in accordance with the invention will now be described in greater detail. The latch body 70 is comprised of a base portion 72, a button portion 76, and an interconnecting stem portion 74. Latch body 70 also includes a pocket or cylindrical blind hole 78 (not to scale) for retaining and protecting the biasing spring 125. The three portions of the latch body 70 also interact to define the forked cavity 80. More specifically, the button portion 76 has a front edge 82 that is spaced from the arm 120 of the base portion 72, and interconnected by front face 75 of the stem portion 74 to collectively define the forked cavity 80. The forked cavity will interact with the housing of the device (not shown) to physically latch the door 20 to the device housing, as will become clearer later herein.

The button portion 76 further includes the back end edge surface 84 and the top force-receiving surface 86 which may be arranged to be inclined with respect to a horizontal plane and which may be provided with ridges 90 that function to prevent the thumb of a user from slipping off the surface when forcibly moving the latch body 70. Button portion 76 (FIG. 5) may have a triangular cross-sectional shape, or any other shape that is complimentary to the overall shape of the latch retaining recess 25. The bottom surface 92 includes the laterally opposed snap catches 95 that are disposed away from stem portion 74 and front edge 82 (see FIGS. 6 and 7) by a same distance. Although only one snap catch 95 can be seen in FIG. 7, each snap catch 95 is identical such that each snap catch 95 will extend into a respective catch pocket 50 to the same extent (see FIG. 4). In FIG. 8A, a snap catch 95 is positioned within the protective catch pocket 50, when in a closed or latched position against the front wall 58 of the catch pocket 50. The operation and relationship between the snap catch 95, biasing spring 125 and protective catch pocket 50 will be provided later herein when the operation of the latching assembly is described.

The latch body base portion 72 has a back end 114, a front end 116 and a bottom surface 124. At the front end 116, the base portion flares into the arm 120, where in FIG. 7, it is seen to extend beyond the front edge surface 117 and is upstanding from the bottom surface 124. The flaring of arm 120 is further emphasized in FIG. 5, where the dashed-lines show the arm 120 extending beyond and above surfaces 117 and 124. This structurally enhanced arm 120 is purposely provided to ensure against breakage when the latch body 70 interacts with the latching surface on the housing of the electronic device and to provide a self-latching feature. The self-latching feature will be described later, when the operation of the latching assembly is provided.

Figure 6:
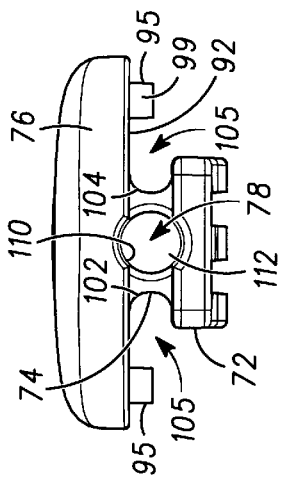
FIG. 6 is a rear view of the door latch body shown in FIG. 5.
Figure 7:
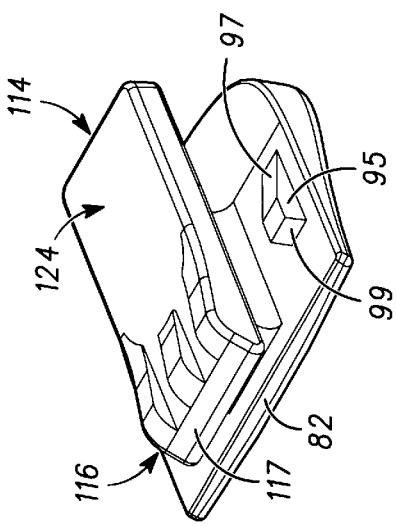
FIG. 7 is a perspective bottom view of the bottom of the latch body shown in FIG. 5.
Figure 5:
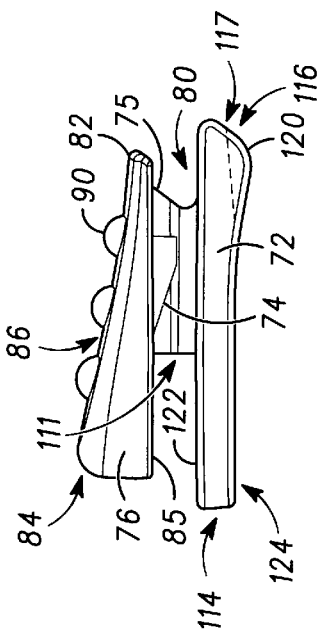
FIG. 5 is a side view of a battery door latch body used in accordance with the latching assembly of the present invention.

As FIG. 6 best illustrates, the stem portion 74 of the latch body 70 includes the spring holder 78 which is formed by providing a blind hole in the stem portion, wherein the blind hole is defined by the cylindrical wall surface 110 that extends between end surface 111 and base wall surface 112. The spring holder 78 physically extends into stem portion 74 to an extent which may be about half of the uncompressed length of the biasing spring 125, and receives part of the biasing spring 125 therein. The spring holder also serves to protect the biasing spring 125 during operation of the latching assembly, as will be explained later.

FIG. 6 also illustrates that the stem portion 74 includes the sides 102 and 104, which are provided with identical grooves that form the opposed rail pockets 105. The rail pockets 105 and the rails 49 form part of the retaining mechanism. Turning attention to FIG. 4 again, this part of the retaining mechanism is seen more clearly. When the latch body 70 is initially inserted within the latch retaining recess 25, the latch body 70 is first slid over the ends of the rails 49 by inserting the rails 49 within the rail pockets 105. At that stage, the latch body 70 is prevented from vertical disengagement from the door. Further sliding of the latch body 70 along each of the rails 49 will cause the lateral sides of the top button portion 76 to flexure slightly upwards as the sloped surface 97 (FIG. 7) on each snap catch 95 rides on top of surface 29 until each of the snap catches 95 drops into a respective protective catch pocket 50. The snap catches 95 and the protective catch pockets 50 represent another portion of the retaining mechanism. This portion prevents longitudinal disengagement of the latch body 70 from the latch body retaining recess 25. During the process of dropping the snap catches 95 in place, the biasing spring 125 will be temporarily compressed, (see FIG. 10) but after the snap catches 95 have dropped, the biasing force of the spring 125 will push the latch body 70 along the rails 49 in a reverse direction such that the front surfaces 99 of each snap catch 95 will abut against a respective front wall 58 of each protective catch pocket 50, as shown in FIG. 8A. The position shown in FIG. 8A represents a closed or latched position where the battery door 20 will be latched into place to the electronic device. In order to remove the battery door 20 from the electronic device, the ridges 90 on the top surface 86 of latch body 70 are engaged (by a thumb) and then pushed in an opposite longitudinal direction, which causes a compression of the biasing spring 125, thereby disengaging the front surface 99 from front wall 58. The extent of travel of each snap catch 95 is limited to about 2 mm prior to the latch body surface 84 contacting the wall 27 of recess 25, as shown in FIG. 8B. It should be emphasized that because each of the snap catch 95 is always operative within a respective protective catch pocket 50 during operation of the latch, the snap catches are protected from breakage during use, handling, or dropping of the electronic device. This feature is an improvement over many of the prior art latching mechanisms since those mechanisms fail to continuously enclose the entire mechanism during use.

Figure 10:
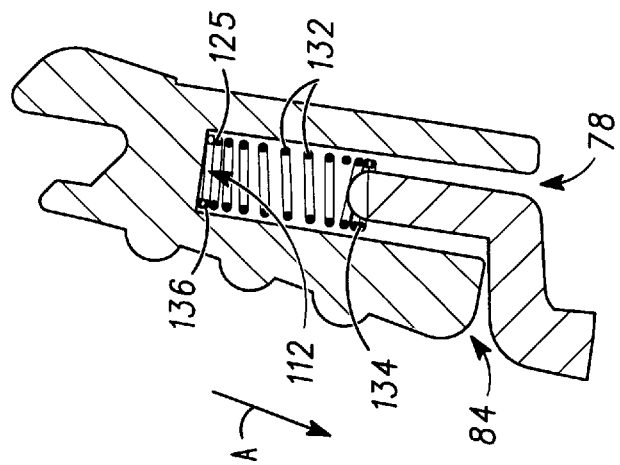
FIG. 10 is a partial cross-sectional view showing the encapsulated biasing spring being fully compressed when in a latch opening position.
Figure 9:
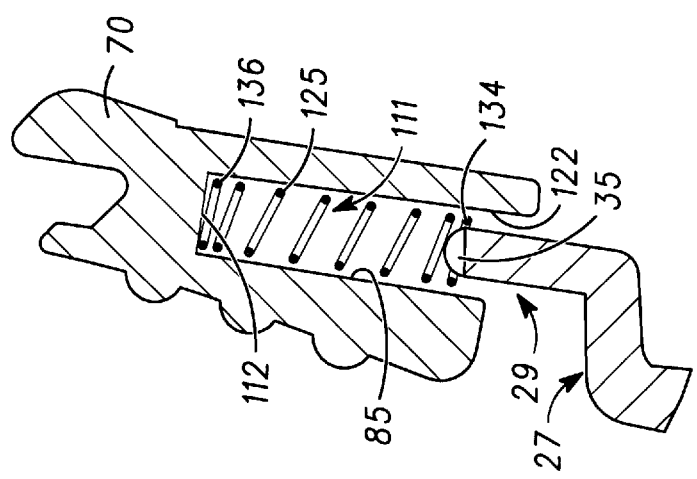
FIG. 9 is a partial cross-sectional view highlighting that the latch door biasing spring is entirely encapsulated and protected when the latch body is in a closed, or resting position.

Referring now to FIGS. 9 and 10, the encapsulation of spring 125 in accordance with the invention will be described. In FIG. 9, it is seen that in a latched or resting state, the biasing spring 125 is fully encapsulated or enclosed by latch body 70. A top end 136 of the spring 125 is received within and fully encapsulated by the spring holder chamber 78. The remaining part of the spring 125 extends beyond end surface 111 has a lower end 134 that is retained between rounded end nub 35 and the spring holder chamber 78. Even though this portion of the biasing spring 125 is not fully received in the spring holder chamber 78 during operation of the latch, this portion is nevertheless always protected and encapsulated by the cooperation of each of the rails 49 and the surfaces 85 and 122. Thus, with the present arrangement, the spring 125 is fully enclosed or encapsulated and it can be appreciated that a fully encapsulated biasing spring 125 will ensure that a user of the device will not tamper with the spring so as to destroy it or compromise its function. Likewise, a fully encapsulated spring ensures that foreign matters like dirt, sand, etc., will not interfere with and comprise the proper functioning of the spring itself, nor the latching assembly.

Figure 11:
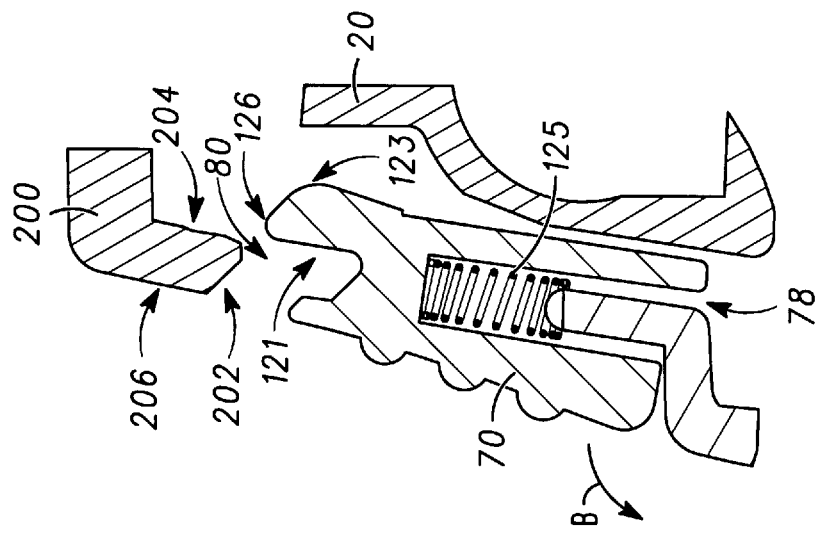
FIG. 11 is a partial cross-sectional view showing the latch body in accordance with the present invention in a closed, or resting position, where the latch body engages a latching surface on the housing of an electronic device.

In the latched state, where the biasing spring 125 is expanded, the forked cavity 80 is extended towards the device housing 200, to receive the housing latching surface 202, as seen in FIG. 11. The planar top surface 121 of arm 120 is in close contact against surface 204 of housing 200, preventing the latch body 70 from pivotal disengagement from the housing 200.

Figure 12:
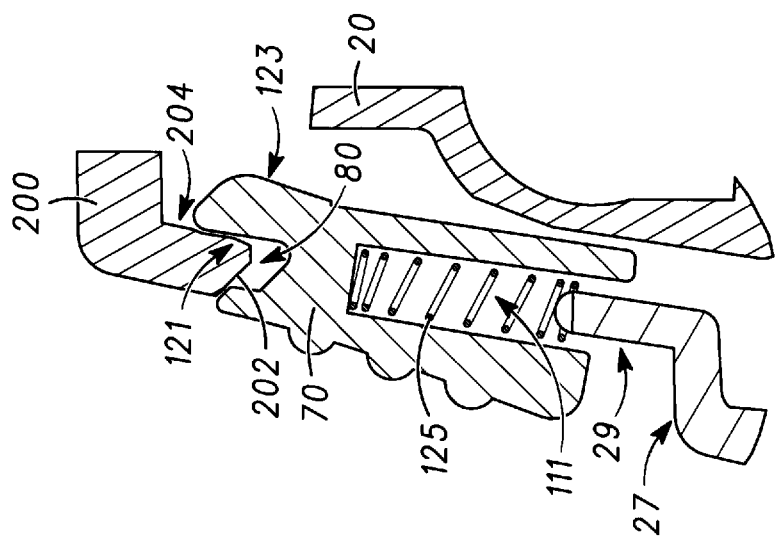
FIG. 12 is a partial cross-sectional view of the latch body shown in FIG. 11, highlighting compression of the biasing spring to disengage the latch body from the housing to remove the battery door.

In FIG. 10, it is seen that the latch body 70 is pushed in the direction of the arrow A when the battery door 20 is to be unlatched from housing 200, thereby compressing each of the coils 132 of the biasing spring 125. As mentioned, back end edge 84 travels about 2 mm to contact against the wall surface 27. As seen in FIG. 12, the above-described operation will disengage the housing latching surface 202 from within the forked cavity 80, thereby allowing the entire battery door 20 to be pivoted away from housing 200 in the direction of the curved arrow. The pivoting of the entire battery door 20 facilitates the removal of the door from the electronic device so that the battery compartment can be viewed. When the battery door is removed from the housing 200, it should be emphasized that the latch body 70 will remain attached to the battery door 20 and will never be removed unless the latch body 70 is completely destroyed by a user. This is another very important feature of the invention, since the latch body 70 cannot ever be removed, the biasing spring 125 will always be encapsulated and protected from the abuses previously described herein. In order to replace the battery door 20 onto the housing 200, the latch body 70 can either be manually manipulated by a pushing movement with a thumb or finger to recompress the biasing spring 125 so as to retract the position of the latch body 70, and hence the forked cavity 80, so the battery door 20 can be repositioned with the housing or latching surface 202 aligned with the forked cavity 80 so that surfaces 204 and 121 slide against each other. In that mode of manipulation, a release of latch body 70 will allow the spring 125 to extend and preload the latch body 70 into engagement with latching surface 202. Alternatively, the latch body 70 can be automatically engaged by merely pivoting the door 20 in a direction opposite to the curved arrow B (FIG. 12), wherein the rounded bottom surface 123 initially contacts and slides against the housing surface 206, compressing biasing spring 125. Further sliding occurs until end tip surface 126 clears surface 202, allowing biasing spring 125 to de-compress and move the cavity 80 towards the housing, where the cavity 80 ultimately encapsulates latching surface 202 such that the latching assembly is again latched.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty. For instance, instead of the above-described door latching assembly being provided on the door/cover portion of a cellular telephone battery, the latching assembly can be situated on the housing of the cellular telephone. Thus, in FIG. 13 the latching assembly can be located on the cellular telephone 300 an a portion 304 of the cellular telephone. Of course, that arrangement would require the door to be provided with a latching surface that could be readily received within the cavity provided on the latch body. One skilled in the art would posses the knowledge to physically convert the structures as such. Therefore, a detailed description of this embodiment is not required. Further changes can be made without departing from the scope of this invention which is defined in the appended claims.

We claim:

1. A spring-biased latch assembly for a portable wireless communication device comprising:

a door with a recess for receiving a latch body, the recess including at least one catch pocket, at least one rail disposed along the recess and a spring holder;

the latch body provided with at least one rail pocket adapted to engage the rail, at least one snap catch adapted to engage the catch pocket, and a blind hole for receiving a spring therein;

the latch body being substantially permanently attached to the door by inserting the spring into the blind hole, sliding the latch body along the rail to advance the spring into the blind hole until the at least one snap catch drops into the at least one catch pocket.

2. The spring-biased latch assembly for a portable wireless communication device of claim 1 wherein the spring is affixed to the spring holder prior to sliding the latch body along the rail.

3. The spring-biased latch assembly for a portable wireless communication device of claim 2 wherein the latch body is aligned with the door by positioning the at least one rail pocket over the at least one rail to advance the spring into the blind hole prior to dropping the snap catch into the catch protection pocket.

4. The spring-biased latch assembly for a portable wireless communication device of claim 1 wherein the latch body includes two laterally opposed rail pockets and the recess includes two laterally opposed rails, wherein the spring holder is disposed between the rail pockets.

5. A latch assembly for maintaining a door upon a housing of a portable telecommunications device, comprising:

a latch body that includes a portion of a locking mechanism for substantially permanently securing the latch body to the door, a latching mechanism for removably latching the door to the housing, and a blind hole therein for receiving and encapsulating a spring for biasing the latch body away from the door and into a locked position with the housing;

a retaining recess formed in the door for receiving the latch body therein, the retaining recess formed of at least one wall having another portion of the locking mechanism formed therein, and a spring holder for holding the spring to the door; and wherein a bias exerted by the spring urges the locking mechanism on the latch body into an abutting engagement with a corresponding surface in the retaining recess, and engages the latching mechanism in a latched position with the housing, and wherein an external translation force applied to a top surface of the latch body compresses the spring to cause sliding movement of the latch body within the retaining recess in the direction of the externally applied translation force to an unlatched position, thereby allowing the door to be disengaged from the housing.

6. The latch assembly of claim 5, wherein the portion of the locking mechanism formed on the latch body comprises a pair of laterally opposed snap catches and the portion of the locking mechanism formed in the retaining recess comprises a pair of opposed catch pockets for engageably receiving and encapsulating the snap catches therein.

7. The latch assembly of claim 6, wherein another portion of the locking mechanism comprises a pair of rail pockets slidably interacting on a pair of corresponding rails, each rail pocket formed on the latch body adjacent to a respective snap catch, and each rail formed in the wall of the retaining recess adjacent to a respective catch pocket.

8. The latch assembly of claim 7, wherein the spring holder is centered between the rails.

9. The latch assembly of claim 7, wherein a base wall of the retaining recess has a U-shaped configuration defined by a pair of laterally spaced legs, each leg comprised of identical, downwardly depending T-shaped members comprised of a horizontal flange and a vertical web.

10. The latch assembly of claim 7, wherein the spring holder includes a laterally opposed pair of nubs, each nub cooperating to retain one end of the spring, thereby retaining the spring on the door.

11. The latch assembly of claim 5, wherein the latching mechanism is comprised of a forked cavity formed into a front end of the latch body, the forked cavity adapted to receive a latching edge surface of the housing when in the latched position.

* * * * *